United States Patent [19]

Gutiérrez Atencio

[11] 4,275,989

[45] Jun. 30, 1981

[54] REVERSIBLE PUMP-TURBINE

[76] Inventor: Francisco J. Gutiérrez Atencio, 3105 Diamante, Entre Rios, Argentina

[21] Appl. No.: 10,406

[22] Filed: Feb. 8, 1979

[51] Int. Cl.³ .......................... F01D 5/02; F03D 11/00
[52] U.S. Cl. ..................................... 415/129; 415/140
[58] Field of Search ............................. 415/129–133, 415/140, 141, 12, 33; 405/77, 78; 290/53

[56] References Cited

U.S. PATENT DOCUMENTS

| | | | |
|---|---|---|---|
| 1,562,556 | 11/1925 | Harza ................................... | 415/133 |
| 3,035,758 | 5/1962 | Caddell ................................ | 415/129 |
| 3,785,747 | 1/1974 | Mayo, Jr. ............................. | 415/33 |
| 4,073,146 | 2/1978 | Guitterez-Attencio ......... | 415/145 X |
| 4,078,388 | 3/1978 | Guitterez-Attencio ............... | 405/78 |

Primary Examiner—Leonard D. Christian

Attorney, Agent, or Firm—Emory L. Groff, Jr.

[57] ABSTRACT

A reversible pump-turbine associated with a fluidic flow directing means defined as a water passageway includes shiftable body component selective displaceable to achieve alternatively, either an energy generation or an energy accumulation mode. One or more fluidic flow directing means are provided each having a, movably engineered or a fixed engineered diffuser body. Selection of energy mode is achieved by rotating the reversible pump-turbine about a verticalized axis, or a horizontalized axis, to position a selected end of its venturi adjacent the end of said fluidic flow conveying means and the other end adjacent said diffuser open end defined in said fluidic flow directing means. If only one conduit is provided, said diffusers are movably engineered into said fluidic flow directing means.

26 Claims, 7 Drawing Figures

REVERSIBLE PUMP-TURBINE

The present invention relates to fluidic flow conveying means such as water conduits, having embodied reversible hydromotive pump-turbines specially arranged to produce an energy transformation purpose either for energy generation or, alternatively for energy accumulation and storage. The proposed structure is intended to be engineered primarily in: water systems within industrial plants, municipal water systems, water refrigeration circuits for electric power plants, expansions of actually available hydroelectric facilities, and functional transformation of hydroelectric plants by introducing the pumped storage principle working with the pure generation hydroelectric mode.

It could be designed also, as a pure pumped storage power plant.

By this instant arrangement, any single or combined fluidic flow conveying conduit arrangement is specially designed to operate in combination with a reversible pump-turbine either in a direct fluidicelectric power generation pattern or in a reversible energy accumulation pattern and at the best possible hydraulic efficiency in either mode.

The reversible pump-turbine includes a horizontally positioned or a vertically positioned axis generator, either of the Harza type following teachings of the U.S. Pat. No. 1,562,556 issued: Nov. 24, 1925 to Leroy F. Harza; or of the bulb type following the teachings of the German patent (Swiss Pat. No. 172,467) issued Dec. 27, 1933 to Mr. P. Huguenin; or of the tube type following the teachings of one Mr. G. Kühne in 1930.

In the Harza type concept, which is shown in our drawings, the generator's rotor is annularly defined around the turbine runner blades and externally positioned outside of the water conduit.

This is the most compact design available up to today and has not been fully developed. Modules up to: 25,000 kW. per machine having runners up to: 5 meters in diameter, are expected to be available in the following years.

These structures have not been introduced in large standardized components in reversible fluidicpowered projects, but will become increasingly popular because of their inherent efficient technical design, good hydraulic performance, reduced cost of serial made standardized components of modulated design, and inherent underground constructive status avoiding costly bureaucratic procedures.

Reversible hydroelectric facilities for purposes of electric energy production, or for purposes of energy accumulation are well known in the art. However, up to today, they have been limited to public electric generation utilities, and private investments have been precluded from investing in such facilities. This is so, because good tolerable efficiency of the energetic transformation therein involved, is the privilege of great powerful schemes only available to electric public utilities services.

Good efficiencies have been precluded to smaller reversible developments.

Another drawback is that, up to today, reversible hydroelectric generation systems have been limited mainly to reversible Francis hydraulic turbines which significantly limits the application of reversible pumped-storage to hydraulic heads ranging between 50–500 meters or more. For hydraulic heads lower than 50 meters, which are feasible to be executed by most private investments; known reversible scheme applications have not been popular because of their inherent higher costs measured in terms of dollars invested per kilowatt installed.

Up to today, available overall efficiency of the transformation of the energetic performance is about 70% without including transmission losses.

Our proposed scheme, instead, will promote the possibility of realizing efficiencies in the range of about: 80% or more, even in small powered schemes and without significant transmission losses.

Standardized components will have power outputs as low as: 1,000 kW. per machine, with heads from: 3 meters to 45 meters; and flows as low as 8 meters cube/second.

According to one aspect of the present invention, there is provided a reversible pump turbine assembly which has a fluidic flow directing conduit incorporated within its cylindrically or spherically shaped body.

In the included described Harza type pump-turbine concept; said conduit is divided into two fixed parts and a movably rotatable one. The upstream fixed portion has the turbine supporting members defined within it, the downstream fixed portion is shaped as a draft tube arrangement without supporting members within it; between them there is found a movably rotatable annular portion defined in a single body around the turbine runner blades, and with the annular rotor of the generator engineered in the outer periphery, that is, outside of the fluidic conveying conduit.

Suitable sealing means avoids spillage in significant amounts between said two fixed components and said movable conduit component.

This cylindrically shaped body, incorporates also, a machine hall which includes the necessary equipment for the operational performance of the reversible pump-turbine; such as: governors, controls, lubrication systems, refrigeration systems, synchronizing devices, and the like.

Optionally, a set of two movably engineered diffusers is available too in the disposition having a unique fluidic flow conduit; and following the teachings of the U.S. Pat. No. 4,073,146. (Feb. 28, 1978), "Submersible Diffuser."

The first of these diffusers is to be positioned downstream of the reversible pump-turbine set; and the second one is to be positioned upstream of same, when in the energy generation mode.

Both diffusers are alternatively selectively positioned in functional coincidence with the downstreamly defined pump-turbine open end conduit, after 180° rotation from said assembly during passage of one energy mode to another accumulation mode and reversely.

When not in use, one of both diffusers is masked within a recess defined into the respective conduit.

Another disposition, provides a twin-double conduit arrangement in which said diffusers are defined as fixed parts each belonging to each one of said conduits. One of them, is used in the accumulation mode of operation; and the other one is used in the energy production mode. Both conduits are coplanarly arranged; either vertically or horizontally as shown in the herewith enclosed Figures.

Accordingly, it is an object of the present invention to provide an improved reversible pump-turbine set designed to operate at low-hydraulic heads, that is, at ranges of maximums having: 50 meters or so with axial flow runners, and 100 meters with diagonal flow runners, with actually available technology (1978), and with a substantially improved energy transformation efficiency.

Another object of the present invention is to provide a reversible pump-turbine machine which may be manufactured, assembled, factory tested, and stored at a servicenter, and which includes an integral machine hall whereby, it includes a fixed bladed turbine runner instead of the movable bladed runner of the costly Kaplan type; and which may be integrally transported as an individual module to be erected and assembled into its respective underground pit.

A further object of the present invention is to provide a pump-turbine set of modest power output but yielding an improved energy transformation efficiency into a privately-owned pumped-storage system.

A further aim of the present invention is to introduce the in-built hydroelectric emergency facility concept into privately-owned industrial facilities, municipal systems, and the like; by means of which, a power outage is almost instantly replaced by said emergency energy producing source.

Still another aim of the present invention is to provide an underground powered facility which is buried into a pit, invisible from outdoors, and which could be filled with water and with compressed air therein; so acting as a differential surge tank having a restricted orifice defined between the upstreamly open end of the set conduit, and the open end of the fluidic conveying means.

Still another object of the present invention is to provide a water or fluidic conduit in which energy wasted for pumping purposes could be significantly recovered in the reversed process, when said stored fluid mass is induced into the industrial process.

Still another aim of the present invention is a pump-turbine machine of the annular generator type (Harza type) which is mainly defined around a substantially verticalized axis instead of one horizontalized one; thus, introducing a great simplification in the engineered design of such machines, which are in R & D today, and which technological break-even position is expected by 1993; thus saving 15 years of costly engineered developments.

Another advantage of the present invention deals with the introduction of the Harza type turbine which, compared with the bulb turbine has the following advantages:

1. Compactness and only one vertical pit required.
2. Sufficient space around the runner periphery for power outputs of larger capacities.
3. Simple and effective cooling of the electric machine.
4. Large natural inertia ensures stable operation and avoids power fluctuations, specially at higher heads.

The generator has a large diameter with a good "flywheel effect" and a fairly simple arrangement for good ventilation and access.

Another object of the present invention is to provide a fluidic flow conduit having a rotatable pump-turbine set within a unique water passageway and cooperable alternatively with two rectilinearly displaceable diffusers, one downstream of said pump-turbine body and the other upstream of the pump-turbine.

Another object of this invention is to provide a double conduit for fluidic flow conveying purposes, one of them for upstream going flows and the other for downstream flows; both connected in cooperation with a pump-turbine set; and having embodied fixed diffusers cooperating with the downstream open end of said turbine-pump set, which is rotatably reversed; and located within an underground pit which, optionally, acts as a differential surge tank.

A preferred and practical embodiment of the invention is described and shown in the accompanying drawings, in which.

Several similar reference characters designate corresponding parts throughout the several Figures of the enclosed drawings.

Figure 1:
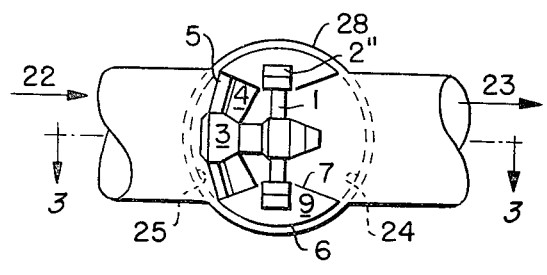
FIG. 1 is a horizontal, longitudinal sectional view of a reversible pump-turbine according to the present invention, as it appears when in the energy accumulation mode.
Figure 2:
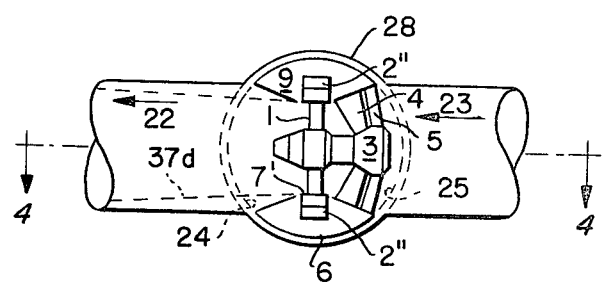
FIG. 2 is a horizontal, longitudinal sectional view of a reversible pump-turbine set as it appears when in the energy generation mode.
Figure 3:
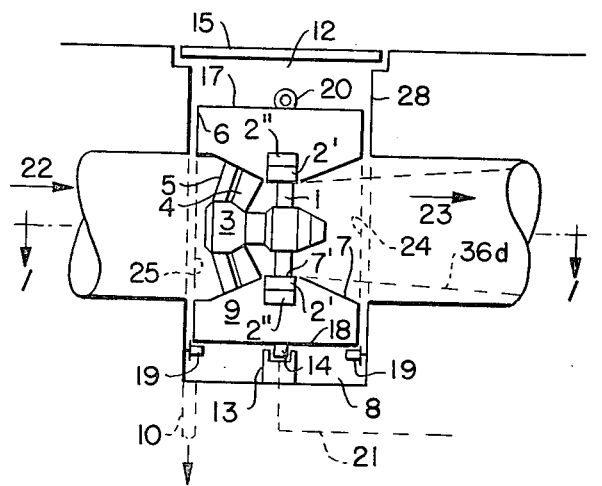
FIG. 3 is a vertical, longitudinal sectional view of the structure shown in FIG. 1.
Figure 4:
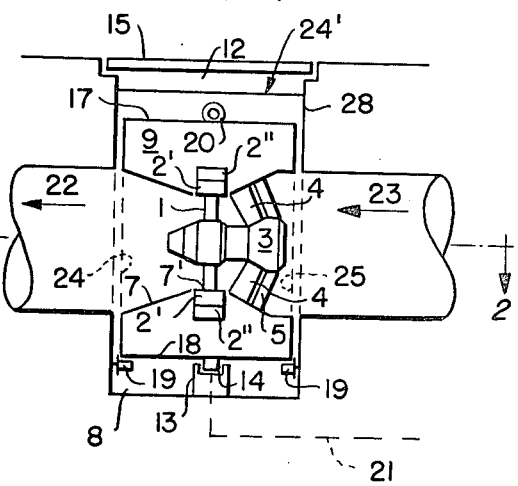
FIG. 4 is a vertical, longitudinal sectional view of the structure shown in FIG. 2, with a pump-turbine embodied within a pit which acts also as a differential surge tank.
Figure 5:
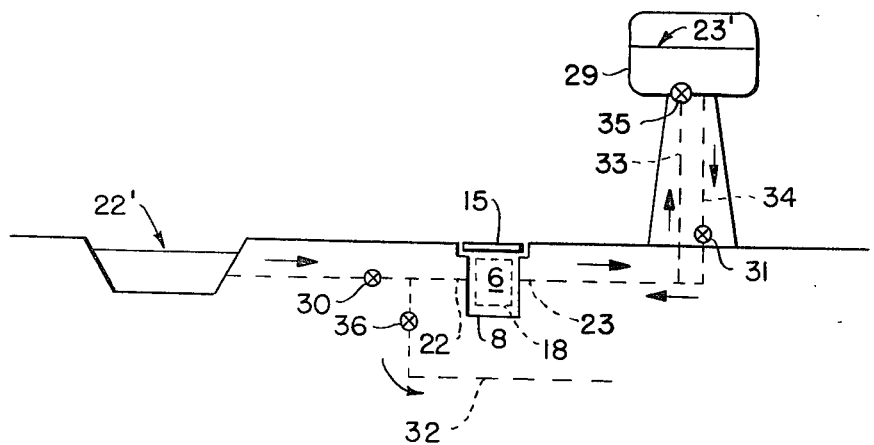
FIG. 5 is a specific proposed layout having a pumped storage station as defined by the invention, and engineered within the privately owned framework of an industrial plant, in their water supply system.
Figure 6:
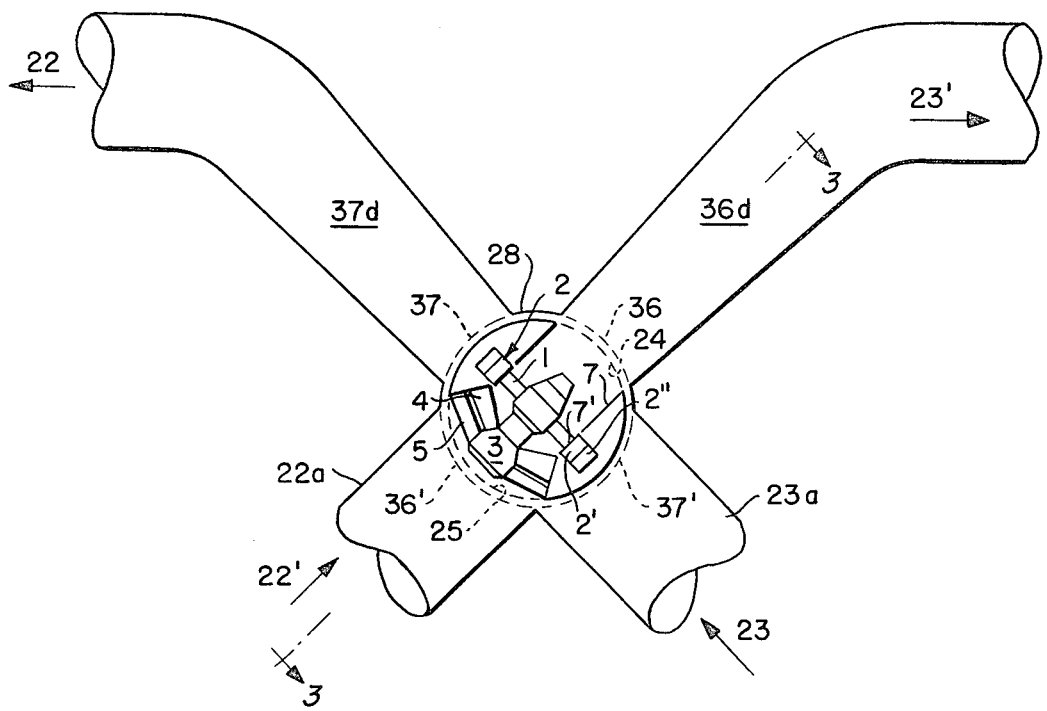
FIG. 6 is a horizontal, longitudinal sectional view of a pump-turbine set combined with two independent conduits coplanarly arranged at a 90° crossing angular pattern with fixed diffusers, and with pump-turbine acting in an accumulation mode.

These parts are described as follows:

Referring now to the drawings, the reversible pump-turbine set of the present invention will be seen to include an energy transformation unit comprising the electric generator-motor 2 having in the Harza type arrangement, a rotatable annular rotor 2' and a fixed stator 2'' also annularly disposed; said rotor being combined with a turbine-pump runner 1 at one end of a guide shaft body 3 housing a thrust bearing and a guide bearing arrangement and supported by a fixed member to conduit intake 7, shown in reference 5; while a movable vane wicket gate arrangement acting as a movable distributor 4 is embodied between body 3 and conduit 7.

Regulation of flows, both in generation mode and in pumping mode, is achieved by means of the movable distributor 4, while the turbine blades are in most circumstances of the fixed type; being the Kaplan movable blade runners engineered in especial applications of more refined designs; not considered here. The energy transformation unit and its turbine-pump 1 may be considered to be a unitary sub-assembly body hermetically enclosed within the capsule 6 of the set.

A substantially longitudinally extending fluid flow circulation path is formed by fixed conduit 7 and rotatable portion 7' of said conduit, and defines the wall limiting the periphery of the fluid flow circulation path and is bounded at one end by a relatively large upstream intake 25 and at the other end by a small output end 24 opening as clearly shown in engineered design detailed in FIGS. No. 6 and 7.

The structural body 6 enclosing the pump-turbine set is provided with an upper face 17, and a bottom face 18, and encloses the hermetic chamber 9 serving as an auxiliary machine hall.

A pit 8 having a cover 15 encloses the full pump-turbine body 6, within lateral walls 28, and resting over a member 13 which surrounds axis 14 while rollers 19 are annularly-coplanarly arranged around wall 28 and permits supporting of base face 18; and being motorized, introduce a rotatably displacement angularly defined into the whole pump-turbine body 6.

Drainage conduit 10 is provided for emptying the pit 8 from liquid discharges. A flexible electric connection 21 is engineered between the electric generator-motor and the external network.

Means 20 permits combination with cranage facilities for removal of the turbine-pump outside of the pit 8.

Downstream low-pressurized conduit 22 and upstream high-pressurized conduit 23 are alternatively combined with open ends 25 of the intake, and 24 of the outflow side of said pump-turbine set.

A body of water could be allowed into pit 8 for purposes of stress relieving rollers 19 defined as supporting means of set body 6 because of the floatation lifting pull induced into it. Then, the rotation sequence will be simplified. Said water body avoids also, sealing means around open end 25 of the turbine-pump set.

If cover 15 is of reinforced design, then, a compressed layer of air 12 is allowed to act on upper face 24' of said body of water introduced into pit 8 and the pit in itself will act and perform as a differential surge tank. Then, transient hydraulic phenomena will be relieved into conduit 23 when the movable distributor operates.

Control is realized by said movable distributor 4 both in the generation mode and in the pumping mode, thus introducing a true novelty in reversible pumped-storage flexibility.

FIG. No. 5 shows a typical layout arrangement, belonging to a privately owned industrial plant water system having a reversible pump-turbine set engineered into it.

For the sake of simplicity, lower water level 22' is shown as a river, lake or pond; while upper water level 23' is shown as a body of water stored in a reservoir 29.

When performing in the accumulation mode, gate 30 is open while gate 36 of the branch conduit is closed or slightly open, and gate 31 is also closed. Fluid flows into conduit 22, through pump runner 1, into conduit 23 and its verticalized branch 33 into reservoir 29 after check valve 35 opens.

If a power outage occurs, then, actuated pump runner 1 stops and check valve 35 is almost instantly closed to retain the body of water 23' in reservoir 29 and avoid back-flows.

Movable distributor vanes 4 are closed to avoid emptying of verticalized conduit 33, while gate 30 is also closed for permitting rotation of pump-turbine set 6.

Then, rollers 19 are motorized from an energized emergency source, over bottom face 18 and the body 6 of said pump-turbine is rotatably displaced within pit body 8. Then, it is fixed into the new generation position by suitable means.

Gates 30 and 31 are now operated and opened while distributor 4 is progressively actuated to start running fluidic flows into the conduits and start turbine runner 1; now, motive flows are directed along verticalized conduit 34 from the stored fluid body 23', and along conduit 23 through turbine 1 and conduit 22 into the downstream sited fluid body 22'.

Alternatively, when electric service is restored; then, gate 30 is closed and fluids are passed into the industrial process through conduit 32 after gate 36 is fully or partly open.

To stop the generation sequence, both gates 31 and 30-36 are closed.

Distributor 4 of pump-turbine set is also closed and body 6 of the same is rotated for positioning it again in the pumping mode.

The pumping mode starts once motor 2 is energized while distributor 4 is actuated to be progressively opened and allows circulation of actuated fluidic flows. Gate 30 is also opened and check valve 35 is actuated and raised and a fluid body is passed once again along conduits 22-23-33 and valve 35 into upper fluid body 23' stored in the reservoir 29, and from lower fluid body 22' belonging to a low level reservoir.

Optionally, selectively controllable movably disposed diffusers, not shown in the Figures, are arranged within conduits 22 and 23 so as to functionally combine them with outflow open end 24 of the pump-turbine fluid flow conveying means.

If said pump-turbine set is verticalized instead of horizontally disposed, then, the chamber of the pit 8 would be engineered in the vicinity of the verticalized branches 33 and 34 of said conduits.

Alternatively, a more refined engineered design could be made available by independently designing said branches 33 and 34 into and from said pit body 8. They could run also, as independent branches in all the fluidic flow paths from lower reservoir 22' and into upper reservoir 23'.

In this later arrangement, we see that fluidic flows running by the generation mode are separately conveyed into conduits 22-23; and that fluid running into the pumping mode are conveyed by conduits 22'-23'.

Said conduits could be horizontally-coplanarly arranged to be crossed at the turbine pit 8 with ends at walls 28 of said pit.

In FIG. No. 6, an angulated 90° crossing arrangement is defined.

In said disposition, turbine-pump set body 6 will be coplanarly rotated by 90° between extreme positions, in one of them upper open end 25 of conduit 7 will be functionally coincidentally positioned in combination with open end 36' of conduit 22a while discharging open end 24 of said conduit 7 will be combined with open end 36' of diffuser 36d to operate in the pumping mode. After rotation by 90° in this arrangement, upper open end 25 of conduit 7 will be functionally coincidentally positioned in combination with open end 37' of conduit 23a while discharging open end 24 of same conduit 7 will be combined with open end 37 fixedly embodied in the conduit branch 37d for operation in the generation mode.

This is the most simple arrangement, having fixed diffuser bodies engineered as conduits portions 23d and 37d. Optionally, chamber 8 of the pit could be filled with water and inducing a floatation lifting pull into pump-turbine body 6 so as to simplify the rotation sequence by reducing stresses upon roller elements 19, and the power required to rotate it.

Said same chamber acts as a differential pressurized surge tank, if a layer of compressed air 12 is defined over water level 24 and below reinforced cover body 15.

In a more sophisticated layout design, said both independent conduits 37d, 23a for the generation fluidic flow path and 22a, 36d for the pumping fluidic flow path, are vertically-coplanarly arranged following a substantially paralleling disposition when arriving at the turbine pit 8 and with open ends defined in walls 28 of said pit, at distincts levels.

In FIG. No. 7 a verticalized disposition is shown.

Within said pit 8, and directed by guiding means defined on walls 28 (not shown), said pump-turbine set body 6 is controllably combinably rotatably-vertically displaced.

Said verticalized displacement could be induced within body 6 into a body of water 24' enclosed in the pit 8; and by introducing gas into hermetic chambers defined in said body 6 when an upwardly displacement is required, or by introducing fluid in same chambers if a downwardly displacement is desired; and following the teachings of the U.S. Pat. No. 4,078,388 (Mar. 14, 1978): "Transportable Hydromotive Assembly."

Retractable roller means 19', controllably masked into recesses 19" defined on walls 28 are provided, permitting supporting and rotation of said pump-turbine body when in its upper position.

For generation purposes, said body 6 has its intake open end 25 of its conduit 7, functionally combined with open end 37' of high pressurized conduit branch 23a, while outlet 24 of set conduit 7 is functionally combined with fixed diffuser open end 37 of low pressurized conduit branch 37d, while rollers 19' are extracted from recesses 19" for permitting supporting of said set body 6. A regulated downwardly pull provides good support on these rollers.

Now, to start the pumping mode cycle; unit 6 is floated over said roller means 19' which are embodied within recesses 19". Then, a downwardly sinking pull is induced into said body 6 until it rests over bottom rollers 19 defined on walls 28 of the pit 8. Here we assume that rotation is produced when body 6 is in its lower position.

Motorizing rollers 19 produces said rotation by 180° angular displacement of body 6 to position it in the pumping mode.

Now, the intake open end of set conduit 7 is functionally combined with open end 36' of low-pressurized conduit 22a, while outlet 24 of set conduit 7 functionally combines with diffuser open end 36 of high-pressurized conduit 36d.

A flexible electrical connection 21 provides electrical connection between motor-generator 2 and the electrical network.

A guide pin 14 defined over member 13 helps in the rotation sequence.

A compressed air layer 12 is defined between water level 24 and reinforced cover 15 and permits the actuation of pit 8 as a differential pressure relief surge tank.

In the accompanying drawings there is substantially shown a pump-turbine set with a horizontally defined axis coincident with the main direction of fluidic flow circulation, and having the annular Harza type generator.

Another design, such as the well known bulb turbine type having a capsule-mounted generator; or the tube type turbine having the generator externally embodied out of the fluid conveying conduit, are to be considered too.

In the Harza type design, by selecting location of pit 8 in the vicinity of the verticalized conduits 33–34 then, an horizontalized pit 8 design is realized having a lateral removable cover embodying a cylindrical pump-turbine body 6 movably disposed within it and having two lateral faces and which rotates around an axis or pins within supporting members, this latter being of the removable type and not shown in the drawings. However, if the removable cover is upperly defined at the wall 28, said pins may be of the retractable type with the pit 8 being horizontalized, the cover 15 acts as a water retaining member and the differential surge tank is realized in an independent layout.

Optionally, horizontalized retractable rollers (not shown), may be annularly-cylindrically defined on walls 28 to cooperate with an axis or pins on pump-turbine body rotation, or serve to fully replace said axis pins.

This pit 8 horizontalized arrangement, permits the introduction of the Harza type verticalized machine design having a simpler engineered layout. In it, annular rotor 2' and pump-turbine runner 1 are supported by thrust bearing 3 and, complementarily, by a plurality of annularly coplanarly disposed hydrostatic bearings defined around the lower rim and the upper rim faces of rotor 2', then stress relieving blades of pump-turbine runner 1. This fact, deals with a great departure from actual technical developments on the matter, because said hydrostatic plurality of bearings acts evenly around the periphery of rotor 2' without distorting it.

In this way, this invention will save time and money in costly research and development, on these machines.

Big verticalized, alternatively horizontalized, pit design as shown in FIG. No. 7 could contain two machines, said second machine being a spare one or, alternatively, acting in the spinning reserve mode. While the lower shown machine runs in full powered energetic accumulation mode, the upper machine is run idle in synchronisation status with the network, in generation mode without energetic production.

Then, if an unexpected power blackout arises; the pumping sequence mode will be instantly shut-down while a full generation reversed sequence mode is available almost instantly, in a matter of seconds.

With this disposition, two independent conduits 23a–37d and 23a, 36d are engineered between upper stored fluid body 23' and lower level defined fluid body 22'.

If a given hydraulic head is not energetically available to a predetermined pre-engineered pump-turbine set; then, a plurality of said sets are serially arranged along conduit 22–23 and could be progressively introduced into it as said head increases; and, inversely, progressively shifted away outside of said conduit as said hydraulic head reduces.

This latter arrangement, represents also, a great departure from actually available pumped-storage concepts.

It flexibilizes also, expansion feasibility to be realized in underground power plants acting as expansions of actually available pure hydroelectric facilities.

In this way, a massively serial made modulated pump-turbine engineered set would be available as a true typified industrialized product following the patterns of the best American style standardized achievements.

In the same way, greater pumped-storage powered facilities, are expanded progressively by paralleling a plurality of conduits 22–23 between two fluid storing reservoirs, as increasing electrical market requirements are poured into the energetic balance of a given geographical area.

Maintenance procedures are simplified too.

Figure 7:
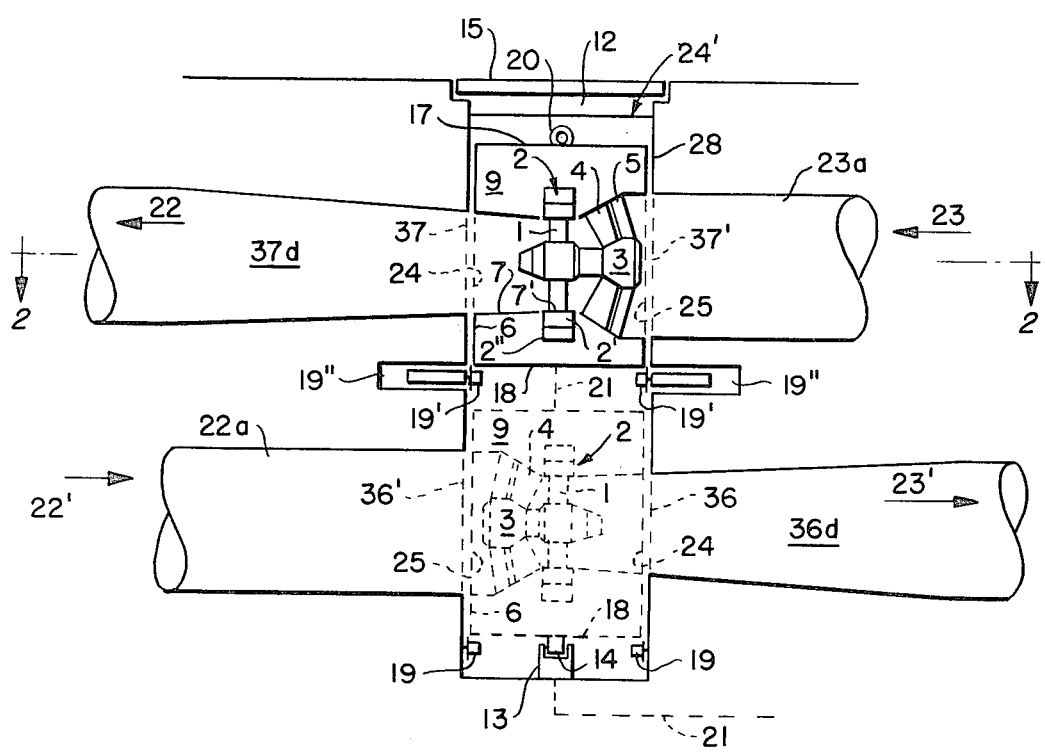
FIG. 7 is a vertical, longitudinal sectional view of a pump-turbine set combined with two independent conduits coplanarly vertically arranged in a parallel pattern and having fixed diffusers, with pump-turbine acting in an energy generation mode and being controllably-movably embodied within a pit which acts also as a differential pressurized surge tank.

For this purpose, adequate enlargement of the volumetric area 12 defined between cover 15 and fluid face 24 as shown in FIG. 7, is realized within the pit 8. Within it, a given pump-turbine set could be flotatably maneuvered so as to be spatially positioned in the best mode for maintenance procedures.

Being of the bulb type, capsule-mounted generator; both turbine-pump runner side and motor-generator side are alternatively reached by a simple 180° rotation around an horizontalized axis being perpendicularly defined relative to the mechanical axis of the set.

This procedure is easily achieved when pit 8 is horizontally engineered, while cover 15 instead of laterally disposed will be upperly defined into wall 28.

Movably displaceable cranes and lifting means facilities, are available also, from pit to pit; for purposes of these maintenance procedures.

This layout is especially useful when a plurality of pits are defined, and progressively increased as market requirements expand, into defined pumped-storage sites having a plurality of pump-turbines sets.

A layout as defined in enlarged pit 8, as shown in FIG. No. 7; and having two operable machines which can pump or generate simultaneously; could be designed having the diffuser body defined a conduit outlet as shown in FIGS. No. 1-2-3-4 in the same rotatable body 6. Alternatively, fixed diffusers $36_d$-$37_d$ shown in FIGS. No. 6-7 could be movably arranged into respective conduit branches.

In same way, movably diffusers are embodied into conduits branches, which are masked into recesses when not in operable status.

Both said diffusers are alternatively positioned against outlet open end 24 of conduit 7 of pump-turbine set body 6, as it is rotated following the varied sequences.

Following the fluidic.electric power concept, fluids other than water are feasible to be used too, such as: chemicals, petroleum products, slurry fluids, and the like.

Expansion of available hydroelectric facilities, would quickly and economically be achieved because of the economics of serial made electro-mechanical components; and underground inherent designs which will avoid costly bureaucratic procedures from environmental protection quarters.

From the foregoing, it will be seen that an improved underground energy transformation pumped-storage station is provided comprising a symmetrical venturi conduit arrangement, including a reversible pump-turbine set alternatively cooperating with two diffusers, to realize a maximum hydraulic efficiency in either a direct generation mode or in a reversed pumping storage accumulation mode; and having a plurality of modulated typified components.

I claim:

1. In a fixed fluidic flow directing conduit including a main structural embodying arrangement having a peripheral wall with open end means defined in it for allowing the passage of a fluidic flow therethrough; the improvement comprising one or more hydromotive assemblies positioned within said embodying arrangement, each said hydromotive assembly including a conduit having a peripheral wall defining a fluid flow circulation path alternatively-controllably disposed in functional combination with said fixed fluidic flow directing conduit, an energy transformation unit disposed in combination with said fluid flow circulation path of said assembly, said transformation unit adapted to activate fluid within said flow path when in energy accumulation mode or to be actuated thereby when in the energy generation mode, said assembly conduit having a first open end and a second open end for discharging fluid entering said first open end, both said first and second open ends configured to be controllably-alternatively positioned against said open ends defined in said embodying arrangement peripheral wall, and means on said hydromotive assembly mounting same in combination with the inner configuration of said embodying arrangement to allow rotatable displacements of said hydromotive assembly between said alternate positions and between their energetic functional transformation performance operative mode running cycles.

2. A fixed conduit having an embodying arrangement as claimed in claim 1 wherein; said first open end of said hydromotive assembly conduit is disposed in functional combination with a high-pressurized fixed conduit open end defined in said peripheral wall of said embodying arrangement, while said second open end of said assembly conduit is functionally combined with a low-pressurized fixed conduit open end defined in said peripheral wall of said embodying arrangement to allow said energy transformation unit to perform in an energy generation mode; while, after rotation, said first open end of said hydromotive assembly conduit is disposed in functional combination with a low-pressurized fixed conduit open end defined in said peripheral wall of said embodying arrangement, while said second open end of said assembly conduit is functionally combined with a high-pressurized fixed conduit open end defined in said peripheral wall of said embodying arrangement to allow said energy transformation unit to perform in an energy accumulation mode.

3. A fixed conduit having an embodying arrangement as claimed in claim 1 including; a diffuser mounted for substantial rectilinear displacement within said fixed conduit and a recess defined therein whereby, following positioning of one of said hydromotive assembly conduit open ends against one said fixed conduit open end defined in said peripheral wall of said embodying arrangement, said diffuser may be displaced toward said hydromotive assembly conduit second open end to provide a smooth continuous fluid flow path through said respectively combined: fixed conduit, hydromotive assembly conduit, and connected diffuser conduit.

4. A fixed conduit having an embodying arrangement as claimed in claim 3 wherein; said diffuser is a fixed portion integrally defined as part of the fluid flow path of said fixed conduit.

5. A fixed conduit having an embodying arrangement as claimed in claim 1 including; two diffusers mounted for substantial rectilinear displacement within each said fixed conduit branches and respective recesses defined therein, whereby; following positioning of one of said hydromotive assembly conduit open ends against one fixed conduit open end defined in said peripheral wall of said embodying arrangement, a selected one of said two diffusers may be displaced toward said hydromotive assembly conduit second open end to provide a smooth continuous water flow path through said respectively combined: fixed conduit, hydromotive assembly conduit, and connected diffuser conduit; while said remaining diffuser being lodged in its respective recess.

6. A fixed conduit having an embodying arrangement as claimed in claim 5 wherein; both said diffusers include at least one hermetic chamber each, engineered to be filled with gas for floatation purposes or, alternatively, with fluid for sinking purposes; so as to controllably-movably induce displacement in each said diffuser body, and between said two alternate positions: one of them in connection with said hydromotive assembly second open end and the other one when lodged in a recess defined in fixed conduit.

7. A fixed conduit having an embodying arrangement as claimed in claim 5 wherein; each said diffuser having engineered guide means defined in its structural body functionally-movably combined with complementary guide means arranged along the portion of the fixed conduit between said two alternate positions, and directing means to induce displacement along said combined guide means.

8. A fixed conduit layout having an embodying arrangement with an hydromotive assembly therein as claimed in claim 1 wherein; said energy transformation unit included in said hydromotive assembly, includes a motor-generator connected to a runner performing as a pump when receiving actuation thereto from the motor or, alternatively, performing as a turbine driving said generator when said runner is actuated by a flow of motive fluid.

9. A fixed conduit layout having an embodying arrangement with an hydromotive assembly therein as claimed in claim 1 wherein; said assembly body having means permitting of substantial vertical displacement thereof within a fluid body, said vertical displacement means including at least one chamber disposed within the body of said hydromotive assembly and of a volume at least sufficient to cause floatation or sinking of said assembly when filled with gas or with fluid, respectively.

10. A fixed conduit having an embodying arrangement as claimed in claim 1 wherein; means are provided to induce rotation of said hydromotive assembly body within the inner space of said embodying arrangement and between said two alternate positions, and to guide said rotation about an axis being substantially perpendicular to the axis of said fixed conduit defined therethrough said embodying spatial arrangement.

11. In, at least a set of two fixed fluidic flow directing conduits including a main structural embodying arrangement having a peripheral wall with respective open end means defined in it for allowing of the passage of respective fluidic flows therethrough in each one of said fixed conduits; the improvement comprising one or more hydromotive assemblies positioned within said embodying arrangement, each said hydromotive assembly including a conduit having a peripheral wall defining a fluid flow circulation path alternatively-controllably disposed in functional combination with each one pf said fixed fluidic flow directing conduits, an energy transformation unit disposed in combination with said fluid flow circulation path of said assembly, said transformation unit adapted to activate fluid within said flow path when in energy accumulation or to be actuated thereby when in energy generation, said assembly conduit having a first open end and a second open end for discharging fluid entering said first open end, both said first and second open ends configured to be alternatively-controllably positioned against each set of open ends defined in said embodying arrangement peripheral wall and belonging to each one of said fixed conduits, and means on said hydromotive assembly mounting same in combination with the inner configuration of said embodying arrangement to allow rotatable displacement of said assembly between said alternate positions; and, alternatively, to allow combinably rotatable-rectilinear displacement of said assembly between said alternate positions and between energetic transformation running cycle modes.

12. In a plurality of fixed conduits having an embodying arrangement enclosing an hydromotive assembly as claimed in claim 11 wherein; said plurality of fixed conduits are coplanarly arranged into at least one plan being substantially perpendicular to the axis around which said hydromotive assembly body is controllably rotated.

13. In a plurality of fixed conduits having an embodying arrangement as claimed in claim 11 wherein; said plurality of fixed conduits are coplanarly arranged into at least one plan being substantially coincident with the axis around which said hydromotive assembly body is controllably rotated.

14. In a plurality of fixed conduits having an embodying arrangement as claimed in claim 12 wherein; a set of at least two conduits are coplanarly arranged, being the first one of said conduits preferably used in the energy generation mode while the second one of said conduits preferably used in the energy accumulation mode; said first open end of said assembly conduit disposed in functional combination with a high-pressurized first conduit open end defined in said peripheral wall of said embodying arrangement, while the second open end of said assembly conduit is disposed in functional combination with a low-pressurized first conduit open end defined in said peripheral wall of said embodying arrangement to allow said energy transformation unit to perform in an energy generation mode; while, after rotation, said first open end of said assembly conduit is disposed in functional combination with a low-pressurized second conduit open end defined in said peripheral wall of said embodying arrangement, while the second open end of said assembly conduit is disposed in functional combination with a high-pressurized second conduit open end defined in said peripheral wall of said embodying arrangement to allow said energy transformation unit to perform in an energy accumulation mode.

15. In a plurality of fixed conduits having an embodying arrangement as claimed in claim 14 wherein; said first conduit having defined a diffuser engineered portion in its low-pressurized branch with its smaller cross-sectional area intake defined as the intake open end on said peripheral wall of said embodying arrangement; while said second conduit having defined a diffuser engineered portion in its high-pressurized branch with its smaller cross-sectional area intake defined as the intake open end on said peripheral wall of said embodying arrangement.

16. In a plurality of fixed conduits having an embodying arrangement as claimed in claim 14 wherein; both said first and second conduits being engineered to be combined as only one full functional independent directing means able to accept direct motive fluidic flows and reversed actuated fluidic flows in a portion of its running path between an upper level fluid storage reservoir and a lower level storage reservoir, while in the remaining portion of said running path being spliced into said first and second conduits.

17. In a plurality of fixed conduits having an embodying arrangement as claimed in claim 13 wherein; a set of at least two said conduits are coplanarly arranged, the first one of said conduits preferably used in the energy generation mode while the second one of said conduits preferably used in the energy accumulation mode; and said first open end of said assembly conduit disposed in functional combination with a high-pressurized first conduit open end defined in said peripheral wall of said embodying arrangement, while the second open end of said assembly conduit is disposed in functional combination with a low-pressurized first conduit open end defined in said peripheral wall of said embodying arrangement to allow said energy transformation unit to perform in an energy generation mode; while, after rotation and rectilinear induced controllable displacement into said hydromotive assembly body, said first open end of said assembly conduit is disposed in functional combination with said low-pressurized second conduit open end defined in said peripheral wall of said embodying arrangement, while the second open end of said assembly conduit is disposed in functional combination with said high-pressurized second conduit open end defined in said peripheral wall of said embodying arrangement to allow said energy transformation unit to perform in an energy accumulation mode.

18. In a plurality of fixed conduits having an embodying arrangement as claimed in claim 17 wherein; said first conduit having defined a diffuser engineered fixed portion in its low-pressurized branch with its smaller cross-sectional area intake defined as the intake open end on said peripheral wall of said embodying arrangement; while said second conduit having defined a diffuser engineered fixed portion in its high-pressurized branch with its smaller cross-sectional area intake defined as the intake open end on said peripheral wall of said embodying arrangement.

19. In a plurality of fixed conduits having an embodying arrangement as claimed in claim 17 wherein; both said first and second conduits being engineered to be combined as only one full functional independent directing means able to accept direct motive fluidic flows and reversed actuated fluidic flows in portions of its running full path between an upper level fluid storing reservoir and a lower level fluid storing reservoir, while, in the remaining portion of said path being spliced into said first and second conduits.

20. In a plurality of fixed conduits having an embodying arrangement as claimed in claim 14 wherein; said second conduit being closed by said assembly structural body while being functionally combined with first conduit; while, after rotation, said first conduit being closed by said assembly structural body while being combined with said second conduit for functional performance.

21. In a plurality of fixed conduits each having an embodying arrangement enclosing an hydromotive assembly therein as claimed in claim 11 wherein; said plurality of fixed conduits and embodying arrangements are controllably-combinably distributed along a variety of fluidic flow circulation paths in such a way that; an instant numerical parmaeter of a variable hydraulic head defined between a lower reservoir level and an upper reservoir level is fractionally and, alternatively, fully controllably distributed between a plurality of controllably-regulated serially arranged hydromotive assemblies, and parallely arranged plurality of hydromotive assemblies.

22. In a plurality of fixed conduits each having an embodying structural arrangement as claimed in claim 21 wherein; said plurality of controllably-combinably distributed hydromotive assemblies are fully paralleled arranged when performing in the lowest numerical parameter of said variable hydraulic head; while, they are fully serially distributed and arranged when performing in the highest numerical parameter of said variable hydraulic head.

23. In a main fixed fluidic flow directing conduit spliced in two substantially coaxially spatially disposed subconduit branches, each performing in a given specific energetic functional performance and being both connected to a main structural embodying arrangement with respective open ends defined in the peripheral walls of said embodying arrangement; the improvement comprising at least one hydromotive assembly positioned within said embodying arrangement, said hydromotive assembly being controllably-alternatively disposed in a given specific energetic functional performance in combination with one branch of said set of two spliced subconduit branches; said hydromotive assembly including a conduit having a peripheral wall defining a fluid flow circulation path alternatively-controllably disposed for said functional performance in combination with each of said two spliced subconduit branches, an energy transformation unit disposed in combination with said fluid flow assembly circulation path, said transformation unit adapted to activate fluid within said flow path when specifically performing in an energy accumulation mode or to be actuated thereby when specifically performing in an energy generation mode, said assembly conduit having a first open end and a second open end for discharging fluid entering said first open end, both said first and second open ends being configured to be alternatively-controllably positioned against each said two subconduit branch open ends defined in said embodying arrangement peripheral wall, and means on said hydromotive assembly mounting same in combination with an inner configuration of said embodying arrangement to allow rotatable displacement of said assembly between said extreme alternate positions.

24. In a main fixed conduit spliced in two subconduits having an embodying arrangement as claimed in claim 23 wherein; one of said subconduit branches being substantially spatially geometrically configurated as a diffuser fluid flow directing means body having a smaller open end within said peripheral wall of said embodying arrangement and a greater open end being defined at the junction of both said subconduit branches; while, the remaining said subconduit branch being substantially spatially geometrically configured as an annularly fluid flow directing means body disposed surrounding said diffuser body and having one of its open ends defined within said peripheral wall of said embodying arrangement while its remaining open end being defined at the junction of both said subconduit branches.

25. A fixed conduit layout having an embodying arrangement as claimed in claim 9 wherein; said embodying arrangement being designed to perform also as a differential pressurized surge tank.

26. In a plurality of fixed conduits having an embodying arrangement as claimed in claim 11 wherein; the body of said transformation unit includes means permitting of substantial vertical displacement thereof within a fluid body, while said embodying arrangement being designed to perform also as a differential pressurized surge tank.

* * * * *